United States Patent [19]
Niessner et al.

[11] Patent Number: 5,393,836
[45] Date of Patent: Feb. 28, 1995

[54] THERMOPLASTIC MOLDING MATERIALS BASED ON POLYCARBONATES, GRAFT POLYMERS AND STYRENE/ACRYLONITRILE COPOLYMERS

[75] Inventors: Norbert Niessner, Friedelsheim; Norbert Guentherberg, Speyer, both of Germany

[73] Assignee: BASF Aktiengesellschaft, Ludwigshafen, Germany

[21] Appl. No.: 163,716

[22] Filed: Dec. 9, 1993

[30] Foreign Application Priority Data

Dec. 10, 1992 [DE] Germany ............... 4241555

[51] Int. Cl.⁶ .............. C08L 25/12; C08L 55/02; C08L 69/00
[52] U.S. Cl. ..................... 525/67; 525/86; 525/146
[58] Field of Search ................ 525/67, 86, 146

[56] References Cited

U.S. PATENT DOCUMENTS

| | | | |
|---|---|---|---|
| 3,130,177 | 4/1964 | Grabowski et al. | 525/67 |
| 4,622,363 | 11/1986 | Eichenauer | 525/67 |
| 4,880,875 | 11/1989 | Wassmuth et al. | 525/67 |
| 4,906,688 | 3/1990 | Fichenauer et al. | 525/67 |

FOREIGN PATENT DOCUMENTS

| | | |
|---|---|---|
| 244857 | 11/1987 | European Pat. Off. |
| 460456 | 12/1991 | European Pat. Off. ........ 525/67 |
| 488930 | 6/1992 | European Pat. Off. |
| 1170141 | 5/1964 | Germany. |
| 345652 | 12/1989 | Germany ............... 525/67 |

*Primary Examiner*—David Buttner
*Attorney, Agent, or Firm*—Keil & Weinkauf

[57] ABSTRACT

Thermoplastic molding materials contain, as essential components,

A) from 1 to 30% by weight of a polycarbonate,
B) from 10 to 50% by weight of a graft polymer
C) from 5 to 80% by weight of a thermoplastic copolymer comprising
   $c_1$) from 50 to 85% by weight of styrene or substituted styrenes of the general formula I or of a mixture thereof and
   $c_2$) from 15 to 50% by weight of acrylonitrile or methacrylonitrile or of a mixture thereof and
D) from 5 to 80% by weight of a thermoplastic copolymer which differs from component C) and comprises
   $d_1$) from 50 to 85% by weight of styrene or substituted styrenes of the general formula I or of a mixture thereof and
   $d_2$) from 15 to 50% by weight of acrylonitrile or methacrylonitrile or of a mixture thereof,
with the proviso that the amount by weight, based on the total weight of component D), of component $d_2$) is lower than the amount by weight, based on the total weight of component C), of component $c_2$).

4 Claims, No Drawings

THERMOPLASTIC MOLDING MATERIALS BASED ON POLYCARBONATES, GRAFT POLYMERS AND STYRENE/ACRYLONITRILE COPOLYMERS

The present invention relates to thermoplastic molding materials containing, as essential components, A) from 1 to 30% by weight of a polycarbonate,
B) from 10 to 50% by weight of a graft polymer composed of
  b₁) from 40 to 80% by weight of a grafting base comprising an elastomeric polymer having a glass transition temperature of less than 10° C. and
  b₂) from 20 to 60% by weight of a grafting shell comprising
    b₂₁) from 50 to 95% by weight of styrene or substituted styrenes of the general formula I

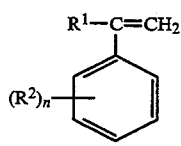

I where $R^1$ is alkyl of 1 to 8 carbon atoms or hydrogen, $R^2$ is alkyl of 1 to 8 carbon atoms and n is 0, 1, 2 or 3, or methyl acrylate or methyl methacrylate or a mixture thereof and
    b₂₂) from 5 to 50% by weight of acrylonitrile, methacrylonitrile, methyl acrylate, methyl methacrylate, maleic anhydride, maleimides N-substituted by $C_1$–$C_8$-alkyl or $C_6$–$C_{20}$-aryl, or a mixture thereof,
C) from 5 to 80% by weight of a thermoplastic copolymer comprising
  c₁ from 50 to 85% by weight of styrene or substituted styrenes of the general formula I or of a mixture thereof and
  c₂) from 15 to 50% by weight of acrylonitrile or methacrylonitrile or of a mixture thereof and
D) from 5 to 80% by weight of a thermoplastic copolymer which differs from component C) and comprises
  d₁) from 50 to 85% by weight of styrene or substituted styrenes of the general formula I or of a mixture thereof and
  d₂) from 15 to 50% by weight of acrylonitrile or methacrylonitrile or of a mixture thereof,
with the proviso that the amount by weight, based on the total weight of component D), of component d₂) is lower than the amount by weight, based on the total weight of component C), of component c₂).

The present invention furthermore relates to the use of these thermoplastic molding materials for the production of fibers, films and moldings and to the moldings thus obtainable from the thermoplastic molding materials.

Owing to their property profile, thermoplastic molding materials based on polycarbonates and styrene/acrylonitrile polymers have a very wide range of uses, for example in automotive construction, in the building sector, in the leisure and sport area, for office machines and in electrical equipment and household appliances.

DE-A 11 70 141 discloses thermoplastic molding materials comprising polycarbonate, graft polymers and styrene/acrylonitrile copolymers. However, good mechanical toughness is achieved only when the amount of polycarbonate is more than about 40% by weight. However, this results in a reduction in the flow and stress cracking resistance.

It is an object of the present invention to provide thermoplastic molding materials which are based on polycarbonates, graft polymers and styrene/acrylonitrile copolymers and have good toughness and good flow when small amounts of polycarbonate are present.

We have found that this object is achieved, according to the invention, by the thermoplastic molding materials defined at the outset. We have also found the use of these thermoplastic molding materials for the production of fibers, films and moldings, and the moldings thus obtainable from the thermoplastic molding materials.

The novel thermoplastic molding materials contain, as component A), from 1 to 30, preferably from 5 to 25, % by weight of at least one polycarbonate.

Examples of suitable polycarbonates are those based on diphenols of the general formula II

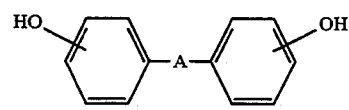

II where A is a single bond, $C_1$–$C_3$-alkylene, $C_2$- or $C_3$-alkylidene, $C_3$–$C_6$-cycloalkylidene or —S— or —SO₂—.

Preferred diphenols of the formula II are, for example, 4,4'-dihydroxybiphenyl, 2,2-bis-(4-hydroxyphenyl)-propane, 2,4-bis-(4-hydroxyphenyl)-2-methylbutane, and 1,1-bis-(4-hydroxyphenyl)-cyclohexane. 2,2-Bis-(4-hydroxyphenyl)-propane and 1,1-bis-(4-hydroxyphenyl)-cyclohexane are particularly preferred.

Both homopolycarbonates and copolycarbonates are suitable as component A), the copolycarbonates of bisphenol A being preferred in addition to the bisphenol A homopolymer.

The suitable polycarbonates may be branched in a known manner, preferably by the incorporation of from 0.05 to 2.0 mol %, based on the sum of the diphenols used, of at least trifunctional compounds, for example those having three or more phenolic OH groups.

Furthermore, the polycarbonates which are suitable as component A) may be monosubstituted, disubstituted or trisubstituted by halogen, preferably chlorine and/or bromine, in the aromatic units. However, halogen-free compounds are particularly preferred.

Polycarbonates which have relative viscosities $\eta_{rel}$ of from 1.10 to 1.50, in particular from 1.25 to 1.40, have proven particularly suitable. This corresponds to weight average molecular weights $M_w$ of from 10,000 to 200,000, preferably from 20,000 to 80,000.

The diphenols of the general formula II are known per se or can be prepared by known processes.

The polycarbonates can be prepared, for example, by reacting the diphenols with phosgene by the phase boundary method or with phosgene in the homogeneous phase (i.e. the pyridine method), the molecular weight to be established in each case being achieved in a known manner by means of a corresponding amount of known chain terminators. (With regard to polydiorganosiloxane-containing polycarbonates, cf. for example German Laid-Open Application DOS 3,334,782.)

Example of suitable chain terminators are phenol and p-tertbutylphenol as well as long-chain alkylphenols, such as 4-(1,3-tetramethylbutyl)-phenol, according to German Laid-Open Application DOS 2,842,005, or monoalkylphenols or dialkylphenols having a total of 8 to 20 carbon atoms in the alkyl substituents, according to DE-A 35 06 472, for example p-nonylphenol, 3,5-di-tert-butylphenol, p-tert-octylphenol, p-dodecylphenol, 2-(3,5-di-methylheptyl)-phenol and 4-(3,5-dimethylheptyl)-phenol.

Further suitable polycarbonates are those based on hydroquinone or resorcinol.

The novel thermoplastic molding materials contain, as component B), from 10 to 50, preferably from 15 to 45, % by weight of at least one graft polymer composed of b$_1$) from 40 to 80, preferably from 50 to 75, % by weight of a grafting base comprising an elastomeric polymer having a glass transition temperature of less than 10° C. and b$_2$) from 20 to 60, preferably from 25 to 50, % by weight of a grafting shell comprising b$_{21}$) from 50 to 95, preferably from 60 to 80, % by weight of styrene or substituted styrenes of the general formula I or methyl acrylate or methyl methacrylate or of a mixture thereof and b$_{22}$) from 5 to 50, preferably from 20 to 40, % by weight of acrylonitrile, methyl acrylate, methacrylonitrile, methyl methacrylate, maleic anhydride, maleimides N-substituted by $C_1$–$C_8$-alkyl or $C_6$–$C_{20}$-aryl, or of a mixture thereof.

Polymers whose glass transition temperature is below 10° C., preferably below 0° C., are suitable for the grafting base b$_1$). These are, for example, natural rubber, synthetic rubber based on conjugated dienes, with or without other copolymers, and elastomers based on $C_1$–$C_8$-alkyl esters of acrylic acid, which may also contain further comonomers.

Preferred grafting bases b$_1$) are polybutadiene (cf. DE-A 14 20 775 and DE-A 14 95 089) and copolymers of polybutadiene and styrene (cf. GB-A 649 166).

Other preferred grafting bases b$_1$) are those composed of l$_1$) from 70 to 99.9, preferably 99, % by weight of at least one alkyl acrylate where the alkyl radical is of 1 to 8 carbon atoms, preferably n-butyl acrylate and/or 2-ethylhexyl acrylate, in particular n-butyl acrylate as the sole alkyl acrylate, b$_{12}$) from 0 to 30, in particular from 20 to 30, % by weight of a further copolymerizable monoethylenically unsaturated monomer, such as butadiene, isoprene, styrene, acrylonitrile, methyl methacrylate and/or vinyl methyl ether and b$_{13}$) from 0.1 to 5, preferably from 1 to 4, % by weight of a copolymerizable, polyfunctional, preferably bifunctional or trifunctional, monomer which effects crosslinking.

Suitable bifunctional or polyfunctional crosslinking monomers b$_{13}$) of this type are monomers which preferably contain two or if required three or more ethylenic double bonds which are capable of undergoing copolymerization and are not conjugated in the 1,3 positions. Examples of suitable crosslinking monomers are divinylbenzene, diallyl maleate, diallyl fumarate, diallyl phthalate, triallyl cyanurate and triallyl isocyanate. The acrylate of tricyclodecenyl alcohol has proven a particularly advantageous crosslinking monomer (cf. DE-A 12 60 135).

This type of grafting base is also known per se and is described in the literature, for example in DE-A 31 49 358.

Preferred grafting shells b$_2$) are those in which b$_{21}$) is styrene or α-methylstyrene. Preferably used monomer mixtures are in particular styrene and acrylonitrile, α-methylstyrene and acrylonitrile, styrene, acrylonitrile and methyl methacrylate, styrene and maleic anhydride. The grafting shells are obtainable by copolymerization of the components b$_{21}$) and b$_{22}$.

Where the graft polymer B) contains a grafting base b$_1$) which is composed of polybutadiene polymers, the term ABS rubbers is used.

The graft copolymerization can be carried out in solution, suspension or, preferably, emulsion, as disclosed in, for example, DE-A 31 49 358. In the preferred preparation of the ABS rubber and with grafting in emulsion, the flexible phase of the graft copolymer has a median particle diameter (d$_{50}$ value of the integral mass distribution) of 0.08 μm. By increasing the size of the particles, for example by agglomeration or when the emulsion is obtained by the seed latex method, the d$_{50}$ value is brought to 0.2–0.5 μm. In the case of such graft copolymerizations, partial or complete chemical bonding of the polymerizing monomers with the polymerized rubber takes place, bonding probably occurring at the double bonds present in the rubber. Some or all of the monomers are thus grafted onto the rubber, i.e. bonded to the linear rubber molecules by covalent bonds.

Grafting may also be effected in a plurality of stages, by grafting on initially some of the monomers forming the grafting shell and then the remainder.

If the grafting base b$_1$) of the graft polymers B) is composed of components b$_{11}$), if required b$_{12}$) and b$_{13}$), the term ASA rubbers is used. Their preparation is known per se and is described in, for example, DE-A 28 26 925, DE-A 31 49 358 and DE-A 34 14 118.

The graft copolymer B) can be prepared, for example, by the method described in German Patent 1,260,135.

The grafting shell of the graft copolymer can be synthesized in one or two stages.

In the case of the one-stage synthesis of the grafting shell, a mixture of monomers b$_{21}$) and b$_{22}$) in the desired weight ratio of from 95:5 to 50:50, preferably from 90:10 to 65:35, is polymerized in the presence of the elastomer b$_1$, in a conventional manner (cf. for example German Laid-Open Application DOS 2,826,925), preferably in emulsion.

In the case of a two-stage synthesis of the grafting shell b$_2$), the 1st stage accounts for in general from 20 to 70, preferably from 25 to 50, % by weight, based on b$_2$). Preferably, only monoethylenically unsaturated aromatic hydrocarbons (b$_{21}$) are used for their preparation.

The second stage of the grafting shell accounts for in general from 30 to 80, in particular from 50 to 75, % by weight, based on b$_2$). Mixtures of the stated monoethylenically unsaturated aromatic hydrocarbons b$_{21}$) and monoethylenically unsaturated monomers b$_{22}$) in a weight ratio b$_{21}$/b$_{22}$ of in general from 90:10 to 60:40, in particular from 80:20 to 70:30, are used for their preparation.

The conditions of the graft copolymerization are preferably chosen so that particle sizes of from 50 to 700 nm (d$_{50}$ value of the integral mass distribution) result.

Measures for this purpose are known and are described in, for example, German Laid-Open Application DOS 2,826,925.

By means of the Saatlatex method, a coarse-particled rubber dispersion can be prepared directly.

In order to obtain very tough products, it is frequently advantageous to use a mixture of at least two graft copolymers having different particle sizes.

In order to achieve this, the size of the rubber particles is increased in a known manner, for example by agglomeration, so that the latex has a bimodal structure (from 50 to 180 nm and from 200 to 700 nm).

The chemical composition of the two graft copolymers is preferably the same, although the grafting shell of the coarse-particled graft copolymer may in particular have a two-stage structure.

Mixtures of components A) and B), where the latter comprises a coarse-particled and a finely divided graft copolymer, are described in, for example, German Laid-Open Application DOS 3,615,607. Mixtures of components A) and B), where the latter comprises a two-stage graft, are disclosed in EP-A 111 260.

The novel thermoplastic molding materials contain, as component C), from 5 to 80, preferably from 10 to 45, % by weight of a thermoplastic copolymer comprising $c_1$) from 50 to 85, preferably from 60 to 80, % by weight of styrene or substituted styrenes of the general formula I or of a mixture thereof and $c_2$) from 15 to 50, preferably from 20 to 40, % by weight of acrylonitrile or methacrylonitrile or of a mixture thereof.

Particularly preferred copolymers C) are those of styrene with acrylonitrile.

The copolymers C) are known per se and can be prepared by free radical polymerization, in particular by emulsion, suspension, solution and mass polymerization. They have viscosities of from 40 to 100, preferably from 50 to 80, ml/g, measured in a 0.5% strength by weight solution in N,N-dimethylformamide at 23° C.

The novel thermoplastic molding materials contain, as component D), from 5 to 80, preferably from 10 to 45, % by weight of a thermoplastic copolymer which differs from component C) and comprises $d_1$) from 50 to 85, preferably from 60 to 80, % by weight of styrene or substituted styrenes of the general formula I or of a mixture thereof $d_2$) from 15 to 50, preferably from 20 to 40, % by weight of acrylonitrile or methacrylonitrile of a mixture thereof.

Copolymers D) of styrene and acrylonitrile are particularly preferred. Regarding the preparation and the viscosity, the statements made above for component C) are applicable and reference is made to them here to avoid repetitions.

As regard to the mechanical properties, in particular the toughness of the novel molding materials, it is essential that the amount by weight, based on the total weight of component D), of acrylonitrile and/or methacrylonitrile (component $d_2$)) is lower than the amount by weight, based on the total weight of component C), of acrylonitrile and/or methacrylonitrile ($c_2$)).

G. E. Molau, Polym. Lett. 3 (1965), 1007–1015 discloses that styrene/acrylonitrile copolymers are immiscible with one another as soon as their acrylonitrile contents differ by more than 5% by weight. Surprisingly, the toughness of mixtures of polycarbonate (component A)), graft polymer (component B)) and styrene/acrylonitrile copolymers (component C)) can be increased by adding a styrene/acrylonitrile copolymer D) which is incompatible with C) and whose acrylonitrile content differs from that of C) by at least 5% by weight.

Furthermore, the novel thermoplastic molding materials may contain up to 60, in particular up to 20, % by weight of fibrous or particulate fillers or mixtures thereof. These are preferably commercial products. Processing assistants and stabilizers, such as UV stabilizers, lubricants and antistatic agents are usually used in amounts of from 0.01 to 5% by weight, but reinforcing agents, such as carbon fibers and glass fibers, in amounts of from 5 to 40% by weight.

The glass fibers used may consist of E, A or C glass and are preferably treated with a size and an adhesion promoter. Their diameter is in general from 6 to 20 $\mu$m. Both rovings and cut glass fibers having a length of from 1 to 10 mm, preferably from 3 to 6 mm, may be used.

Fillers or reinforcing agents, such as glass spheres, mineral fibers, whiskers, alumina fibers, mica, quartz powder and wollastonite, may also be added.

Other examples are metal flakes (for example, aluminum flakes from Transmet Corp.), metal powders, metal fibers, metal-coated fillers (for example, nickel-coated glass fibers) and other additives which shield against electromagnetic waves. Al flakes (K 102 from Transmet) are particularly suitable for EMI (electromagnetic interference) purposes, as well as mixtures of this material with additional carbon fibers, conductive carbon black or nickel-coated carbon fibers.

The novel molding materials may furthermore contain additives which are typical and commonly used for polycarbonates, SAN polymers and graft copolymers based on ASA or ABS or mixtures thereof. Examples of such additives are dyes, pigments, antistatic agents, antioxidants and in particular the lubricants which are required for the further processing of the molding material, for example in the production of moldings or shaped articles.

Components A) and D) and, if required, the additives may be mixed by any known method. However, the components are preferably mixed together in an extruder, kneader or roll mill, if necessary the components having been isolated beforehand from the solution obtained in the polymerization or from the aqueous dispersion. However, the products of the graft copolymerization which are obtainable in aqueous dispersion (component B)) may also be partially dewatered or mixed directly as a dispersion with the components C) and D) and then with the polycarbonate A) and, if required, additives. The molding material is preferably prepared by mixing in an extruder at from 200° to 320° C.

The novel thermoplastic molding materials can be processed by the known methods for processing thermoplastics, for example by extrusion, injection molding, calendering, blow molding, pressing or sintering.

The novel thermoplastic molding materials have in particular high impact strength and good flow.

EXAMPLES

The median particle size and the particle size distribution were determined from the integral mass distribution. The median particle sizes are in all cases the weight average of the particle sizes, as determined by means of an analytical ultracentrifuge by the method of W. Scholtan and H. Lange, Kolloid-Z, und Z.-Polymere 250 (1972), 782–796. The ultracentrifuge measurement gives the integral mass distribution of the particle diameter of a sample. From this it is possible to determine the percentage by weight of the particles which have a diameter equal to or smaller than a certain size. The median particle diameter, which is also referred to as the $d_{50}$ value of the integral mass distribution, is defined as the particle diameter at which 50% by weight of the particles have a diameter smaller than the diameter which corresponds to the $d_{50}$ value. Likewise, 50% by weight of the particles then have a diameter greater than the $d_{50}$ value. In order to characterize the width of the particle size distribution of the rubber particles, the $d_{10}$ and $d_{90}$ values obtained from the integral mass distribution are used in addition to the $d_{50}$ value (median particle diameter). The $d_{10}$ and $d_{90}$ values of the integral mass distribution are defined similarly to the $d_{50}$ value, except that they are based on 10 and 90% by weight, respectively, of the particles. The quotient $$\frac{d_{90} - d_{10}}{d_{50}} = Q$$

is a measure of the width of the particle size distribution. The following components were used:

A) A commercial polycarbonate based on bisphenol A, having a relative solution viscosity $\eta_{rel}$ of 1.3 ml/g, measured in a 0.5% strength by weight solution in methylene chloride at 23° C.

B1) A finely divided graft copolymer prepared from $\beta_1$) 16 g of butyl acrylate and 0.4 g of tricyclodecenyl acrylate, which were heated to 60° C. in 150 g of water while stirring, with the addition of 1 g of the sodium salt of a $C_{12}$-$C_{18}$-paraffrinsulfonic acid, 0.3 g of potassium persulfate, 0.3 g of sodium bicarbonate and 0.15 g of sodium pyrophosphate. 10 minutes after initiation of the polymerization reaction, a mixture of 82 g of butyl acrylate and 1.6 g of tricyclodecenyl acrylate was added in the course of 3 hours. After the end of the monomer addition, stirring was continued for a further hour. The resulting latex of the crosslinked butyl acrylate polymer had a solids content of 40% by weight, the median particle size (weight average) was determined as 76 nm and the particle size distribution was narrow (quotient Q=0.29).

$\beta_2$) 150 g of the polybutyl acrylate latex obtained according to $\beta_1$ were mixed with 40 g of a mixture of styrene and acrylonitrile (weight ratio 75:25) and 60 g of water, a further 0.03 g of potassium persulfate and 0.05 g of lauroyl peroxide were added and heating was then carried out at 65° C. for 4 hours while stirring. After the end of the graft copolymerization, the polymerization product was precipitated from the dispersion by means of calcium chloride solution at 95° C., washed with water and dried in a warm air stream. The degree of grafting of the graft copolymer was 35% and the particle size was 91 nm.

B2) A graft copolymer which was prepared as follows:

A polybutadiene latex was prepared at 65° C. by polymerizing 60 g of butadiene in the presence of a solution of 0.6 g of tert-dodecyl mercaptan, 0.7 g of a sodium $C_{14}$-alkylsulfonate as an emulsifier, 0.2 g of potassium peroxodisulfate and 0.2 g of sodium pyrosulfate in 80 g of water. After the end of the polymerization, the polymerization autoclave was let down; the conversion was 98%.

A polybutadiene whose median particle size was 100 nm was obtained. The resulting latex was agglomerated by adding 25 g of an emulsion of a copolymer of 96 g of ethyl acrylate and 4 g of methyacrylamide with a solids content of 10% by weight, a polybutadiene latex having a median particle size of 350 nm being formed. After the addition of 40 g of water, 0.4 g of a sodium $C_{14}$-alkylsulfonate and 0.2 g of potassium peroxodisulfate, 40 g of a mixture of styrene and acrylonitrile in a weight ratio of 70:30 were added in the course of 4 hours. The polymerization was carried out with stirring of the batch at 75° C. The conversion, based on styrene/acrylonitrile, was virtually quantitative.

The graft rubber dispersion obtained was precipitated by means of an aqueous magnesium sulfate solution and dewatered.

C) A copolymer of styrene and acrylonitrile in a weight ratio of 65:35, having a viscosity number of 80 ml/g (measured in a 0.5% strength by weight solution in dimethylformamide at 23° C.) and prepared by continuous solution polymerization by a method as described in, for example, Kunststoff-Handbuch, Vieweg-Daumiller, volume V (Polystyrol), Carl-Hanser-Verlag, Munich 1969, page 124, lines 12 et seq.

D) A copolymer of styrene and acrylonitrile in a weight ratio of 75:25, having a viscosity number of 80 ml/g (measured in a 0.5% strength by weight solution in dimethylformamide at 23° C.) and prepared by continuous solution polymerization by a method as described in, for example, Kunststoff-Handbuch, Vieweg-Daumiller, volume V (Polystyrol), Carl-Hanser-Verlag, Munich 1969, page 124, lines 12 et seq.

Examples 1 and 2

Components A) and D) were extruded in a ZSK 30 twin-screw extruder from Werner and Pfleiderer at 200 rpm and with a throughput of 10 kg/h, and the extrudate obtained was cooled and then granulated. The molding materials for the property tests were produced by injection molding from the dry granules of the samples.

Examples 3 and 4

Components B and C as well as B and D were mixed in a weight ratio of B:C=1:1 and B:D=1:1 at 250° C. in a ZSK 30 twin-screw extruder from Werner and Pfleiderer at 200 rpm and with a throughput of 10 kg/h, the mixture was extruded and the extrudate was cooled and granulated. In a second step, these granules were then mixed with component A), once again in a twin-screw extruder (ZSK 30 from Werner and Pfleiderer; 200 rpm; 10 kg/h; 250°), the mixture was extruded and the extrudate granulated. The molding materials for the property tests were likewise produced by injection molding.

Comparative Examples V1 to V4

The procedure was similar to Examples 1 and 2.

Comparative Examples V5 to V8

The procedure was similar to Examples 3 and 4.

The compositions and properties of the thermoplastic molding materials are listed in the table.

The heat distortion resistance was determined by means of the Vicat softening temperatures by method B/50 (DIN 53 460) using standard small bars measuring 60 mm×6 mm×4 mm. The flow was determined by measuring the melt volume index MVI according to DIN 53 735 at 200° C. under a load of 21.6 kg and at 220° C. under a load of 10 kg.

The notched impact strength $a_k$ was determined according to DIN 53 453. The injection temperature/test temperature is stated in °C.

The total penetration energy $W_g$ was determined according to DIN 53 443 at a test temperature of −40° C. and 23° C. using 2 mm thick circular disks having a diameter of 60 mm and injection molded at 280° C.

TABLE

| | Examples/Comparative Examples | | | | | | | | | | | |
|---|---|---|---|---|---|---|---|---|---|---|---|---|
| | 1 | 3 | 2 | 4 | V1 | V5 | V6 | V2 | V7 | V8 | V3 | V4 |
| Components [% by wt.] | | | | | | | | | | | | |
| A) | 20 | 20 | 20 | 20 | — | — | — | 20 | 20 | 20 | — | 20 |
| B1) | 40 | 40 | — | 40 | 50 | 50 | 50 | 40 | 40 | 40 | — | — |
| B2) | — | — | 30 | — | — | — | — | — | — | — | 30 | 30 |
| C) | 30 | 30 | 40 | 10 | 50 | 50 | — | 40 | 40 | — | 70 | 50 |
| D) | 10 | 10 | 10 | 30 | — | — | 50 | — | — | 40 | — | — |
| Vicat [°C.] | 98 | 95.2 | 105 | 94.8 | 87 | 85.1 | 86.5 | 97 | 95.5 | 95 | 100 | 104 |
| MVI [ml/10 min] 200° C./21.6 kg | 3.6 | 4.2 | — | 4.0 | 4.6 | 4.9 | 4.2 | 3.6 | 4.1 | 4.0 | — | — |
| MVI [ml/10 min] 220° C./10 kg | — | — | 5.8 | — | — | — | — | — | — | — | 4.5 | 5.0 |
| $a_k$ (220/23) [kJ/m²] | 20 | 20 | — | 17 | 8 | 17 | 8 | 14 | 14 | 8 | — | — |
| $a_k$ (250/23) [kJ/m²] | 23 | 28 | 15 | 21 | 11 | 29 | 5 | 22 | 28 | 9 | 12 | 13 |
| $a_k$ (280/23) [kJ/m²] | 30 | 31 | — | 23 | 29 | 29 | 5 | 31 | 31 | 11 | — | — |
| $a_k$ (250/−40) [kJ/m²] | — | — | 6 | — | — | — | — | — | — | — | 4 | 4 |
| $W_g$ (280/−40) [Nm] | 22 | — | — | — | 10 | — | — | 12 | — | — | — | — |
| $W_g$ (280/23) [Nm] | — | 46 | — | 47 | — | 44 | 43 | — | 45 | 46 | — | — |

We claim:

1. Thermoplastic molding material consisting essentially of:
   A) from 1 to 30% by weight of a polycarbonate,
   B) from 10 to 50% by weight of a graft polymer consisting essentially of
      b₁) from 40 to 80% by weight based on the total weight of B), of a grafting base comprising an elastomeric polymer having a glass transition temperature of less than 10° C. and
      b₂) from 20 to 60% by weight based on the total weight of B), of a grafting shell comprising
         b₂₁) from 50 to 95% by weight based on the total weight of b₂), of styrene or substituted styrenes of the formula I

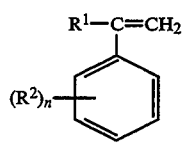

where $R^1$ is alkyl of 1 to 8 carbon atoms or hydrogen, $R^2$ is alkyl of 1 to 8 carbon atoms and n is 0, 1, 2 or 3, or methyl acrylate or methyl methacrylate or a mixture thereof and
         b₂₂) from 5 to 50% by weight of acrylonitrile, methacrylonitrile, maleic anhydride, maleimides N-substituted by $C_1$-$C_8$-alkyl or $C_6$-$C_{20}$-aryl, or a mixture thereof,
   C) from 5 to 80% by weight of a thermoplastic copolymer comprising c₁) from 50 to 85% by weight based on the total weight of C), of styrene or substituted styrenes of the general formula I or of a mixture thereof and
      c₂) from 15 to 50 % by weight based on the total weight of C), of acrylonitrile or of a mixture thereof and
   D) from 10 to 45% by weight of a thermoplastic copolymer which differs from component C) and consists essentially of
      d₁) from 50 to 85% by weight based on the total weight of D), of styrene or substituted styrenes of the general formula I or of a mixture thereof and
      d₂) from 15 to 50% by weight based on the total weight of D), of acrylonitrile or methacrylonitrile or of a mixture thereof, with the proviso that the amount by weight, based on the total weight of component D), of component d₂) is at least 5% by weight-lower than the amount by weight, based on the total weight of component C), of component c₂).

2. The thermoplastic molding material as claimed in claim 1, which contains
   component A) in an amount of from 5 to 25% by weight,
   component B) in an amount of from 15 to 45% by weight,
   component C) in an amount of from 10 to 45% by weight, and
   component D) in an amount of from 10 to 45% by weight.

3. A thermoplastic molding material as claimed in claim 1, wherein component C) consists essentially of
   c₁) from 60 to 80% by weight based on the total weight of C), of styrene or substituted styrenes of the formula I or of a mixture thereof
   c₂) from 20 to 40% by weight based on the total weight of C), of acrylonitrile or methacrylonitrile or of a mixture thereof
   and component D) consists essentially of
   d₁) from 60 to 80% by weight based on the total weight of D), of styrene or substituted styrenes of the formula I or of a mixture thereof and
   d₂) from 20 to 40% by weight based on the total weight of D), of acrylonitrile or methacrylonitrile or of a mixture thereof.

4. A molding obtained from a thermoplastic molding material as claimed in claim 1.